June 7, 1966 L. GRASSER 3,254,393

SEMICONDUCTOR DEVICE AND METHOD OF CONTACTING IT

Filed Oct. 31, 1961

United States Patent Office 3,254,393

Patented June 7, 1966

3,254,393

SEMICONDUCTOR DEVICE AND METHOD OF CONTACTING IT

Leo Grasser, Munich, Germany, assignor to Siemens & Halske Aktiengesellschaft, Berlin and Munich, Germany, a corporation of Germany Filed Oct. 31, 1961, Ser. No. 148,958
Claims priority, application Germany, Nov. 16, 1960, S 71,282
5 Claims. (Cl. 29—155.5)

This invention relates to a semiconductor device and method of contacting it and is particularly concerned with a semiconductor device having a semiconductor body, and an electrode which is over a relatively large area connected with a contact member, and with a method of effecting the contacting.

In order to secure in the operation of a semiconductor device efficient dissipation of the heat generated at the electrodes, it is essential that a large area connection be provided with a contact part which is a good heat conductor. This was until now accomplished by soldering the electrode to a contact member, employing for this purpose an intermediate layer of tin. It has been found that the tin is at the high temperatures occurring in operation at the electrode, easily converted at some places to the $y$-modification, which makes the soldered connection practically useless owing to the brittleness and tendency thereof to form crystallization spots.

The object of the invention is to avoid this disadvantage by disposing between the contact member and the electrode a layer of a soft material which is a good heat conductor and provided at least at the parts thereof which face the respective electrode and contact member, with a wetting substance, and connecting such layer with the contact member and the electrode by heating to a temperature lying above the melting point of the wetting substance.

The advantage of providing a soft layer which is a good heat conductor resides in avoiding mechanical stresses caused by the differences in the thermal coefficients of expansion of the electrode metal and the semiconductor body incident to a thermal loading of the respective semiconductor component, thereby eliminating the danger of cracks forming in the semiconductor, which can occasion formation of recombination centers and even breakage of the respective component.

In accordance with a particularly advantageous embodiment of the invention, the connection is effected at a temperature lying below the melting point of the contact member and the soft material and also below the melting point of the electrode metal.

A particularly advantageous example of an embodiment of the invention will now be described with reference to the accompanying drawing.

Figure 1:
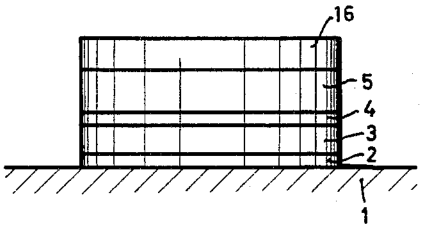
Figure 2:
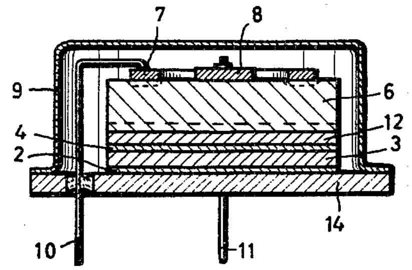

FIG. 1 shows in schematic manner parts of a semiconductor device according to the invention, such parts being arranged in relative position to aid in explaining the cooperation thereof in producing the device; and FIG. 2 illustrates a transistor constructed according to the invention.

Referring now to FIG. 1, numeral 16 indicates a semiconductor body provided on its underside with an electrode 5 which is made, for example, of gold. Upon the supporting or mounting member 1 which also serves as a contact member and which is made of a good heat conductor, is provided a layer 3 made of soft material which is likewise a good heat conductor, for example, lead, such layer 3 being provided with a substance, in the present case indium, adapted to wet the electrode 5 and the contact member 1. The wetting substance which is indicated by the layers or coatings 2 and 4 need be provided only upon the surface portions of the layer 3 facing respectively the electrode 5 and the contact member 1. The electrode 5 is placed upon the layer or coating 4 and the whole system is heated to a temperature, preferably in a protective gas atmosphere, at which the respective coatings 2 and 4, serving for the wetting, become liquid, such temperature amounting in the present example to about 160° C. All other parts of the arrangement remain solid. There is thus obtained a mechanically and electrically efficient connection or bonding between the electrode 5 and the supporting contact member 1, such connection securing good dissipation of the heat from the electrode. The provision of the soft intermediate layer 3, disposed between the electrode and the contact member, avoids breakage of the structure which otherwise could easily happen incident to thermal loading, owing to the different thermal coefficients of expansion of the semiconductor body and the contact member.

The invention thus provides for large area contacting of semiconductor components without incurring particular mechanical stresses. Moreover, the contacting can be effected at relatively low temperatures.

In a particularly advantageous embodiment of the invention, a lead foil with indium rolled thereon is provided between the electrode and the contact member and connected or bonded thereto by heating.

FIG. 2 shows a transistor, wherein the collector electrode 12 made, for example, of gold or a gold-antimony alloy, is in accordance with the invention connected with a contact member 14 made of iron and forming the bottom or mounting plate or supporting plate of the structure. The semiconductor body 6 which consists, for example, of p-conducting silicon, is provided with a base electrode 8 made, for example, of aluminum and with an annular emitter electrode 7 consisting, for example, of a gold-antimony alloy surrounding the base electrode. The housing cap 9 is connected with the plate 14 in gas-tight manner. Through the plate 14 which also serves as a terminal connection for the collector 12 extend the emitter lead-in 10 and the base lead-in 11.

The invention is also advantageously applicable for the large area contacting of electrodes of rectifiers, especially high capacity rectifiers.

Changes may be made within the scope and spirit of the appended claims which define what is believed to be new and desired to have protected by Letters Patent.

I claim:

1. In the art of making a semiconductor device having an electrode and a contact member, the method of connecting said electrode in large area contact with said contact member, comprising placing between said electrode and said contact member a layer of lead to form a good heat conductor and provided with indium as a wetting substance at least at the parts of the surface thereof facing the respective contact member and the electrode, and heating the assembly to a temperature lying above the melting point of the indium to thereby firmly bond said lead layer to the electrode and to said contact member.

2. A method according to claim 1, wherein said bonding is effected at a temperature lying respectively below the melting point of said contact member and the lead layer as well as below the melting point of said electrode.

3. A method according to claim 2, wherein said indium is rolled upon said lead layer.

4. A method according to claim 3, wherein said lead layer is in the form of a foil, and said indium is rolled upon said layer.

5. A semiconductor device comprising a semiconductor arrangement having a contact member and an electrode in large area contact with said contact member, said electrode being made of gold, said contact member being made of iron and forming the mounting plate of the device, said electrode being bonded to said mounting plate over its entire surface which faces the latter through the medium of a layer of lead provided with indium on the parts of the surfaces thereof which respectively face the electrode and the mounting plate.

References Cited by the Examiner

UNITED STATES PATENTS

| | | | |
|---|---|---|---|
| 2,258,681 | 10/1941 | Hoglund | 29—504 X |
| 2,362,893 | 11/1944 | Durst | 29—504 X |
| 2,474,643 | 6/1949 | Webb | 29—501 X |
| 2,497,665 | 2/1950 | Gravley | 29—498 X |
| 2,530,110 | 11/1950 | Woodyard. | |
| 2,623,273 | 12/1952 | Murray et al. | 29—504 X |
| 2,820,932 | 1/1958 | Looney | 29—498 X |
| 2,908,851 | 10/1959 | Millea et al. | 29—25.3 X |
| 2,917,686 | 12/1959 | Boyer et al. | 317—234 |
| 2,922,092 | 1/1960 | Gazzara et al. | 29—155.5 X |
| 3,002,135 | 9/1961 | Warren | 29—194 X |
| 3,020,454 | 2/1962 | Dixon | 317—234 |
| 3,046,651 | 7/1962 | Olmon et al. | 29—155.5 X |
| 3,089,067 | 5/1963 | Baird | 317—234 |

JOHN F. CAMPBELL, *Primary Examiner.*